Figure 7:
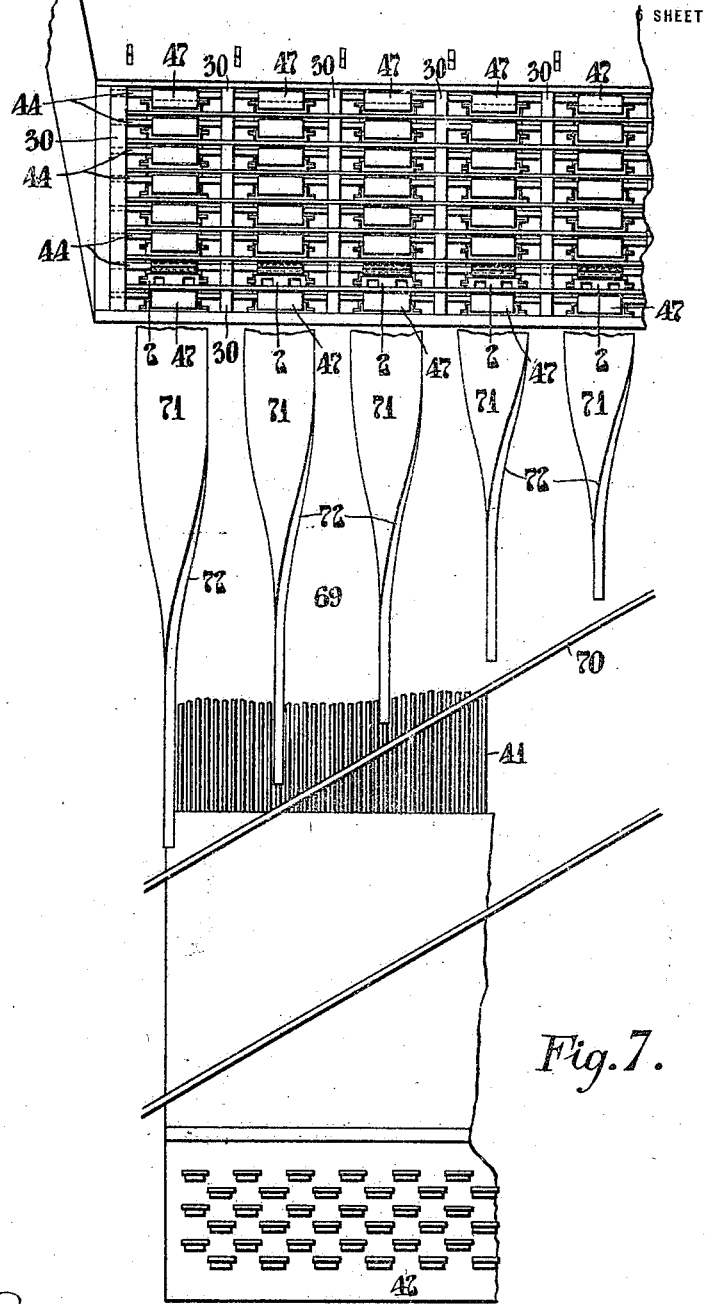

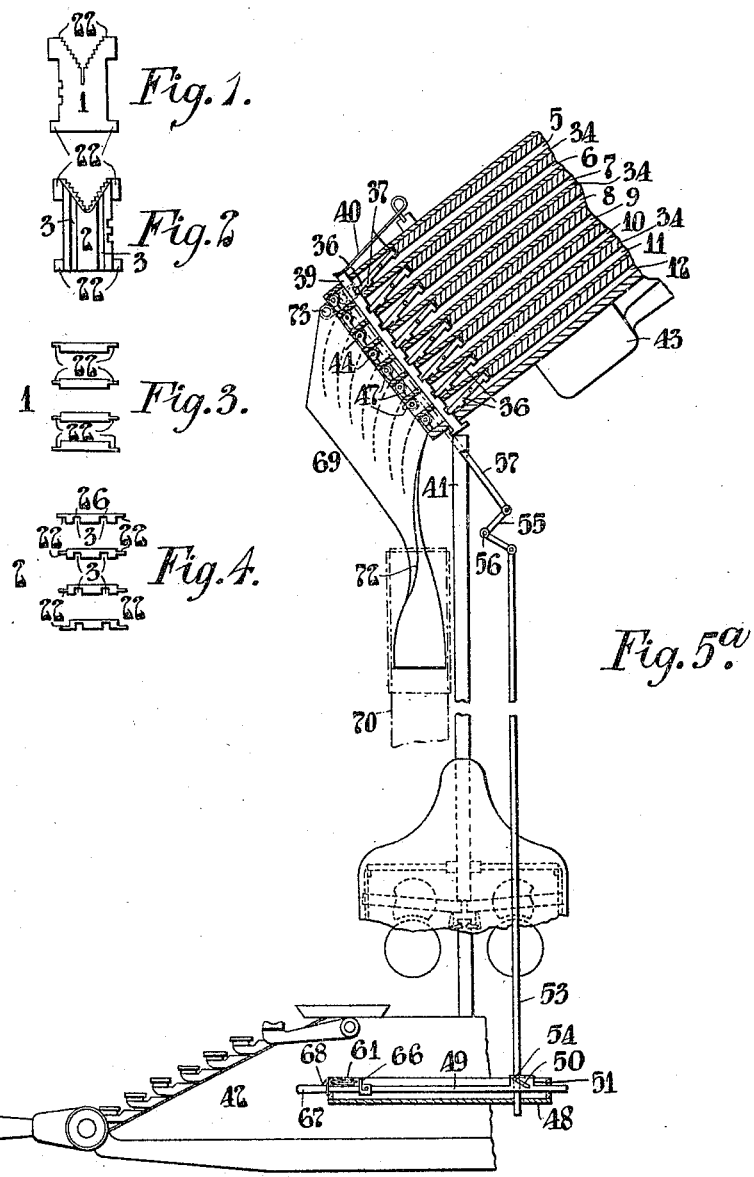

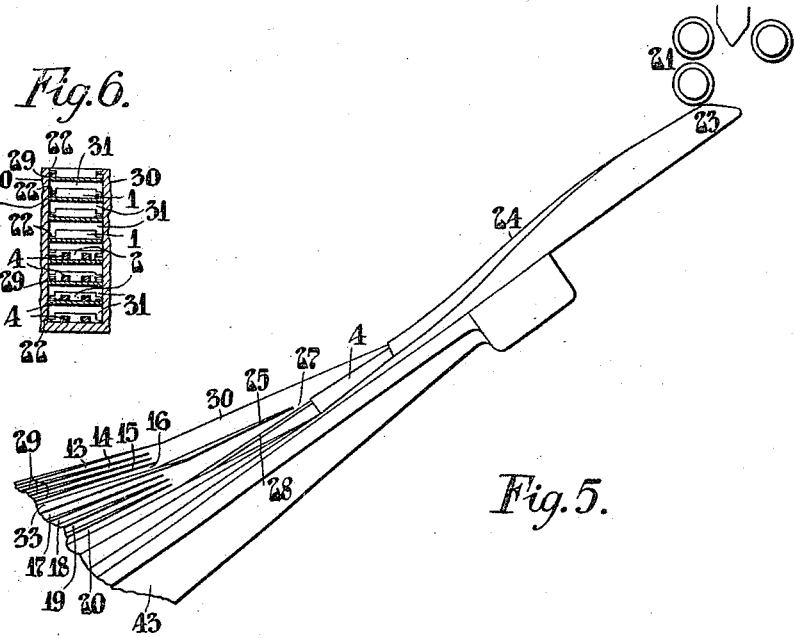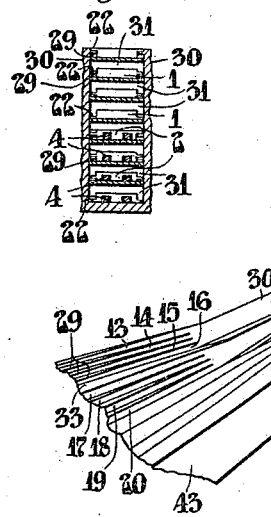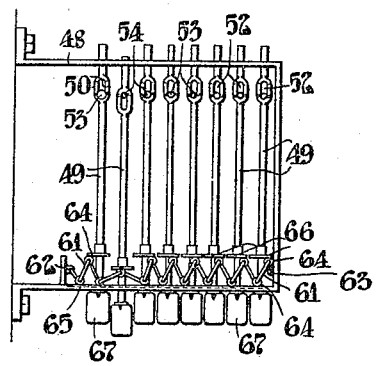

W. E. ELLIOTT.
TYPOGRAPHICAL COMPOSING AND DISTRIBUTING MACHINE.
APPLICATION FILED JULY 16, 1913.
1,158,662.
Patented Nov. 2, 1915.
6 SHEETS—SHEET 4.
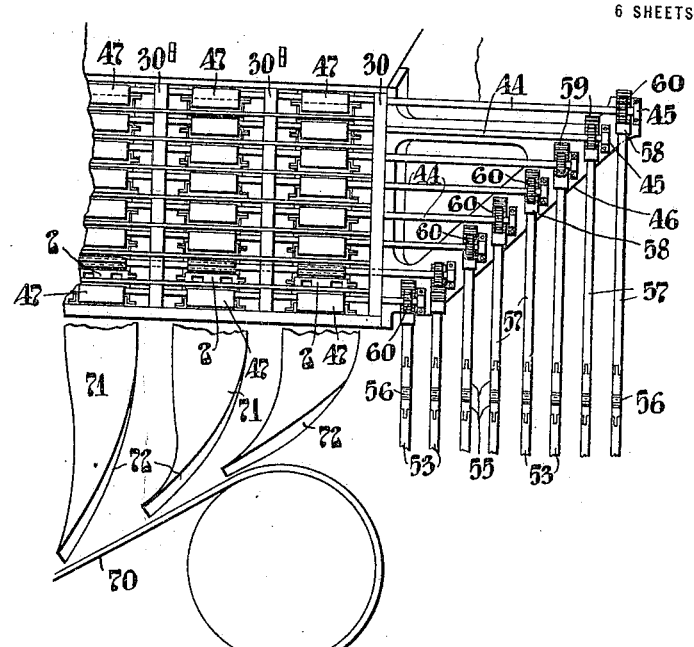
Fig.7.ᵃ
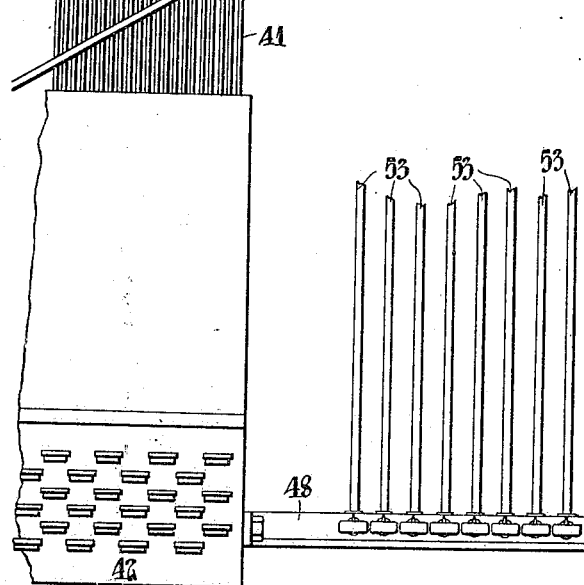

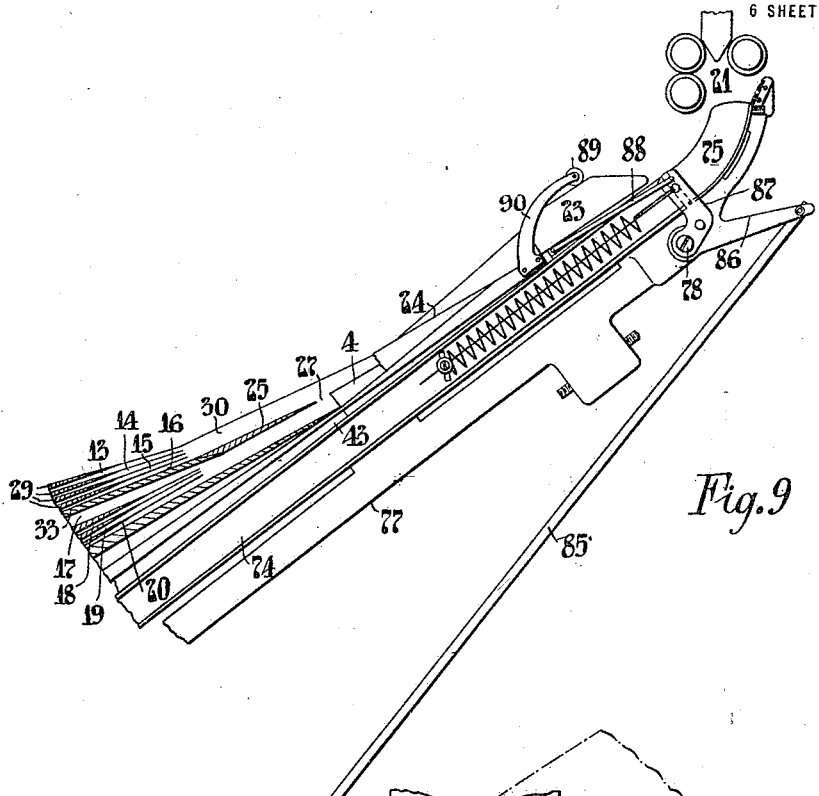
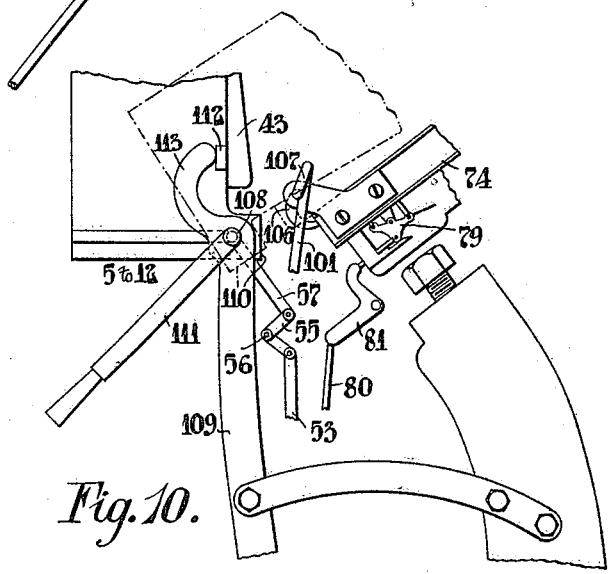

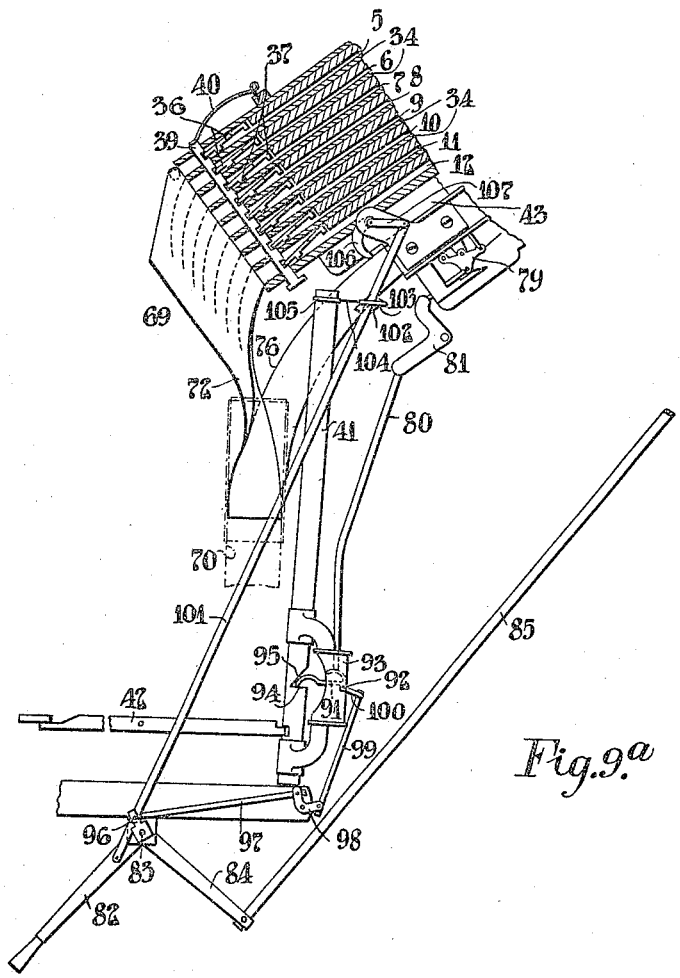
Fig. 9.ᵃ

UNITED STATES PATENT OFFICE.

WILLIAM EBENEZER ELLIOTT, OF LIVERPOOL, ENGLAND, ASSIGNOR TO MERGENTHALER LINOTYPE COMPANY, A CORPORATION OF NEW YORK.

TYPOGRAPHICAL COMPOSING AND DISTRIBUTING MACHINE.

1,158,662.

Specification of Letters Patent. Patented Nov. 2, 1915.

Application filed July 16, 1913. Serial No. 779,409.

*To all whom it may concern:*

Be it known that I, WILLIAM EBENEZER ELLIOTT, a subject of the King of the United Kingdom of Great Britain and Ireland, residing at 133 Salisbury road, Wavertree, Liverpool, in the county of Lancaster, England, have invented new and useful Improvements in Typographical Composing and Distributing Machines, of which the following is a specification.

The present invention consists of improvements in typographical composing and distributing machines for display work, head lines, and the like, such as the lines of displayed advertisements or of title pages; the head lines of news columns in newspapers, or of articles in periodicals or serial magazines; and the like. It is especially applicable to machines now known commercially under the trade mark "Linotype" if they have more than one magazine. Such a machine composes a line in the desired face or faces, uses it, and then distributes it. A patent for the United States on a machine so known is No. 436532, September 16th 1890, and it described a machine equipped with a single magazine and a single face. A multiplicity of magazines and of faces, have been added by subsequent patents. In the machine shown in the above patent were employed matrices from which printing bars (now commonly known as slugs) were to be cast, or of type dies such as would indent a flong. The former of these two uses, is the only one to which the machine has been actually put; nevertheless, the terms "matrix", "matrices", are hereinafter to be understood as respectively including "type die" and "type dies".

It follows from the applicability above referred to, that it is advantageous to adopt it as a point of view from which to describe the invention and this has been done. But it must be borne in mind that, subject to the limiting effect (if any) of the accompanying claims, the said invention is not limited to machines known commercially under the trade mark "Linotype".

The improved matrices and magazines differ from those of the commercial machine above referred to by the former lying in and passing through the latter flat side up instead of in an edge-up position. The matrices are further distinguished from those of the said machine by their lugs being capable of selecting in respect of distribution for set or font, the particular magazine from which the respective matrices had been composed and into which they must be returned, by reason of the lugs of one font being at a level either higher or lower than that of the lugs of any other font. The invention includes means for separating the matrices in respect of distribution for font into groups of fonts, by reason of the matrices of one group having flat sides and all the other matrices having grooved sides, both flat sides and grooved sides coöperating with rails alined with the direction in which the matrices move, whereby the grooved matrices, because they straddle the rails, are separated from the flat side matrices which cannot so straddle the said rails, into another group of fonts. Thus one depth of grooving and one set of rails effects a separation of all the matrices into two groups of fonts. If separation into a greater number of groups is required, the depth of grooving is increased in each additional group and there is an additional set of rails for each such group, the sets being alined with each other in the direction above mentioned.

The improved magazines are held together column-wise and are not vertically adjustable for change of font.

There is only one distributer and this is of the well known construction for distributing according to character. The matrices drop from it into the respective grooves of a magazine entrance common to all the magazines in the column. Each of these grooves is twisted through a quarter of a circle so as to turn the matrices from the edge-up position which they have when they enter the said entrance, into the on-the-flat one already described.

The total number of magazines may be divided into groups of convenient size. Thus, a column of eight magazines is advantageously divided into two groups of four magazines each. A matrix issuing from its groove in the magazine entrance, slides down over the rails toward the magazines of the top group, if its bottom face is not grooved; but if it is grooved, the grooves straddle the rails, and the matrix slides down toward the magazines of the bottom group. The magazines of a group are distinguished from each other by the level at which a pair of ledges project inwardly from the sides of the respective magazine, one ledge from each side and opposite its fellow ledge. The level of any given pair of ledges is the level of the under side of the magazine-selecting lugs on the matrices belonging to the respective magazine, so that as a matrix comes up to the entrance mouth of its group, its lugs will select its proper magazine out of the four otherwise open to it by sliding on to the respective pair of ledges.

A matrix escapement is of the usual two pawl type adapted to coöperate with the two lugs on one side edge of a matrix, by being wholly within the magazine and pivoted on the side of the respective magazine groove.

The front ends of the levers of each set are connected to links working in the well known way in a plane at right angles to the slope of the magazines and through the latter, the links being normally depressed by springs to lock the leading matrices in their respective grooves and having their bottom ends engaging, or being engaged by, the top ends of the usual escapement rods that connect the escapement levers with the keyboard, in the well known way.

Obviously the delivery mouth of only one of the improved magazines may be open at a time. To provide for this, as well as for the optional selection by the operator, of the one to be open, there is a rod extending along the top of each mouth and turning in suitable bearings. This rod carries one or a series of mouth closers for each delivery mouth. As many pull-and-push rods as there are mouth-closer rods, are arranged in a row near the key board, and there is combined with them, a lazy tongs arrangement of links which makes the (say) pulling out of one of the pull-and-push rods, push in all the others. Each of these rods is connected with its respective mouth-closer rod, by a pinion fast on the respective end of the latter and a third rod sliding in suitable guides and having one end connected with the respective pull-and-push rod by a cam groove on the latter engaging a pin on the respective end of the former, the opposite end of which is in the form of a rack, such rack engaging the respective pinion, the correlation being such that the actuation of the selected pull-and-push rod makes the respective third rod turn the respective mouth-closer rod to open the respective delivery mouth, at the same time returning the pull-and-push rod last actuated, closing the delivery mouth last opened, and maintaining all the other mouths closed.

The assembler entrance is of any suitable type but it must have a matrix turner to put the matrices (which, it will be gathered, drop from their magazines on the flat i. e., with what were their top sides to the front) in the usual edge-to-the-front position for entering the assembler. It may also have the usual assembler belt for preventing transposition of matrices.

The invention includes the combination of the above described column of magazines and matrices and the necessary coöperating organs, with a machine of the above described commercial type having its own stationary magazine or magazines and magazine entrance. When so combined, the distributer bar permuted for ninety different kinds of matrices, is made use of for the matrices in the column of improved magazines. As these matrices lie on the flat, there are only about 30 columns of them, instead of ninety, in a magazine, and they are toothed to drop from the distributer bar at each third permutation, the magazine entrance being grooved accordingly.

The magazine entrance of the stationary magazine has the usual rocking movement up to and away from the distributer to put it into and out of matrix receiving position with reference thereto, and the magazine entrance to the improved column of magazines has a sliding connection therewith so that it can be moved out of and into matrix-receiving position. When one is moved into that position, the other is moved out of it and vice versa. These movements are effected simultaneously by suitable linkages worked by a hand lever situated near the keyboard and which latter is common to both the stationary magazine or magazines and the column of magazines.

There is a second row of escapement rods adjacent to, and, preferably to the rear of the one already mentioned, and there must be a switch for switching this second row into or out of coöperation with the keyboard. This switch consists, preferably, of, for each front and rear escapement rod, a notch in the front rod, a lever on a fixed fulcrum and so shaped that its front end can be engaged in the said notch or disengaged from it while its rear end remains in working contact with the rear rod, and a connection to the said lever near the keyboard, the arrangement being such that when all the levers are engaged with the front rods, the magazine entrance to the stationary magazine is in the matrix-receiving position and vice versa. Thus, as it is through rods of the front row that the key-levers on the keyboard actuate the rods o rear row, the former are always at work and their work is prevented from letting matrices drop from the respective improved magazine when they are not wanted in the composed line, by any suitable type of magazine mouth-closer connected to, say, the above mentioned hand lever near the keyboard.

To allow of the stationary magazine being "quick changed" the column of improved magazines is, as a whole, pivoted by its bottom front edge to the machine frame and provided with suitable means, e. g., a hand lever, for tilting it up so as to clear the stationary magazine, and with means for holding it so tilted.

The accompanying figures illustrate a preferred constructional form of the invention.

Figure 1 is a plan of an improved matrix as it lies in its magazine channel: Fig. 2, an inverted plan of an improved matrix grooved in its bottom side: Fig. 3, a front elevation of four matrices of the ungrooved group, and lugged at four different levels for as many magazines: Fig. 4, a front elevation of four matrices of the grooved group and lugged at four different levels for as many magazines. These four figures are on an enlarged scale. Figs. 5 and 5ª taken together, a sectional side elevation including keyboard, assembler, column of magazines and distributer: Fig. 6, a sectional rear elevation of the entrances to the magazines of an eight magazine machine showing the matrices divided into two groups and each group subdivided by the lugs of the matrices: Figs. 7 and 7ª together constitute a partial front elevation of the said constructional form: Fig. 8, a detail plan of the lazy tongs arrangement: Figs. 9 and 9ª taken together, a sectional side elevation of a machine equipped with a single stationary magazine and the invention shown in Figs. 5 and 5ª, but omitting the magazine mouth-closers of the latter; and Fig. 10, a detail side elevation of the means by which the column of magazines shown in Figs. 5ª and 9ª can be rocked out of the way when it is desired to "quick change" a stationary magazine.

1, 1 are matrices of one group and 2, 2 matrices of the other group. They differ from the matrices of the commercial machine above identified in the following three respects. First—so long as they are within or are passing through their magazines they are on the flat or stand in a flatwise position with their side faces parallel with the side plates of the magazine, as indicated in Figs. 1 and 2 and shown in Figs. 6, 7 and 7ª instead of edge up. Second—a certain proportion of the sets or fonts of matrices—say one half—is separable as a group, from the other fonts, by having longitudinal grooves 3, 3, in the bottom sides of all the matrices. The object of these grooves is to enable the matrices to straddle the same number of rails 4—Fig. 5 (obviously only one of them is visible, the other standing behind it). These rails are fixed to the column of magazines 5 to 12 in such a way as to be alined with the travel of the matrices as they approach the entrance mouths 13 to 20 of the magazines on their way thereto from the distributer 21. The matrices of the other fonts, have their bottom sides ungrooved, i. e., flat or plain as heretofore, the object of the absence of grooves being to prevent them straddling the said rails 4. Thus when one half of the matrices is grooved and the other half not grooved, there are produced two groups—1 and 2—see Figs. 1 to 4, 6, 7, and 7ª. Third—the lugs 22 (two projecting from each side edge as heretofore) are capable of selecting, for the purpose of the final distribution of the matrices, the particular one of the magazines 5 to 12, from which they were composed and into which it is required that they should be returned. This capacity is secured to them by the lugs 22 of each matrix of a font being at a level setwise of the matrix either higher or lower than that of the lugs of any other font. This difference in level is clearly shown per se in Figs. 3 and 4.

The number of groups into which the fonts of matrices is divided, depends fundamentally upon the thickness of the matrices. It has been assumed that as the matrices—being for display work, head lines, and the like—are thick, they are thick enough for their lugs 22 to be at four levels. The criterion for the number of these levels is the thickness of the ledges (described farther on) in the matrix channels and with which the lugs 22 coöperate to effect the selection above described, together with the maintenance of sufficient strength in the said lugs to withstand all the strains to which they will be subjected as they pass through the machine. Further, it has been assumed that there are eight magazines in the column. Eight divided by four settles the number of groups as two. If there had been twelve magazines, that number would have been three, if the number of levels were three, the number of groups would be two with six magazines and three with nine. If the division of magazines by levels leaves a remainder, the latter constitutes a group having the remainder number of levels.

The reason why there are two grooves in a grooved matrix is that one would not prevent a matrix tipping out of the flat and that more than two are not required to keep it in that position.

The magazines are held together in the form of a column in the well known way and are not vertically adjustable for change of font.

There is only one distributer 21 for all the magazines of this column and this is of the well known permuted bar and traversing screw construction for distributing matrices according to character. The matrices travel along it in the usual way and drop from it as heretofore into the respective channels of a general magazine entrance 23 common as heretofore to all the magazines in the column. Each of these channels is twisted through a quarter of a circle as indicated at 24 in Fig. 5, to enable it to turn the matrices sliding down it from the edge-up position which they have when they enter the said entrance 23 into the on-the-flat one already described.

Any matrix issuing from its channel in the magazine entrance 23, slides down the rails 4. The ungrooved matrices 1 of one group being restricted by the absence of grooves to sliding corporeally above the said rails, slide off them on to a rearward extension 25 of the bottom plate of the top group of magazines 5 to 8. The grooved matrices 2 of the other of the two groups (it has been pointed out that only two groups are provided for by the illustrated construction) slide down the rails 4, it is true, but, because of their grooves 3, they straddle these rails so that only that portion 26 of their thickness—see Fig. 4—which the said grooves leave them, is then corporeally above the rails 4, and their bottom sides practically too low to slide onto the extension 25. There is therefore, no alternative for them but to slide through the port 27 between the rails 4 above and the extension 25, on to a rearward extension 28 of the bottom plate of the bottom group of magazines 9 to 12. Thus one depth of grooves 3 in half the fonts of matrices, divides the latter into two groups. In other words, the number of groove depths and of the coöperating ports, is one less than the number of groups into which the fonts are to be divided. If three groups were required there would be two different groove depths, three groups of magazines, and a second pair of rails, a second port, and a second extension between the rails 4 and the extension 25 to conduct the fonts grouped from the other fonts by the intermediate groove depth into the intermediate group of magazines.

The grouped matrices slide over the extensions 25, 28 to the entrance mouths 13 to 20 of their respective magazines 5 to 12, and there each meets the devices with which the lugs 22 coöperate to select the magazine to which the respective matrix belongs. These devices consist of a ledge or switch 29—Figs. 5 and 6—projecting inwardly from each side 30 of each entrance mouth 13 to 20 and of each matrix channel 31 in a magazine, excepting in the case of one row of those mouths and channels. The excepted row may be either the top or the bottom one of a group of them. According to the constructional form illustrated, it is the bottom one. One lug 29 is exactly opposite its fellow lug in both mouth and channel and their common width such that the matrices shall slide by their lugs 22 smoothly over them. The matrices that have entered the general magazine entrance 23 having been divided into groups by the rails 4, any matrix proceeds to automatically select and enter the magazine to which it belongs. Thus, those that had been composed from magazine 8 have their lugs 22 flush with their bottom sides. These, therefore, miss all the ledges 29 and slide on to the plate 33 which extends from one side of the column of entrance mouths 13 to 20 and magazines 5 to 12 to the other, thereby dividing them into two groups and from there on to the bottom plate 34 of their matrix channel 31 in the respective magazine. And those that were composed from magazine 5 have their lugs 22 at a level proper for engaging on the top pair of ledges 29 and slide along them until they are over and on the bottom plate 34 of their matrix channel 31 in the respective magazine.

So long as there are bottom plates 34, the ledges 29 need not extend as far as the delivery mouths of the magazines, but may stop where a matrix will drop from them fairly on to a bottom plate. But the plate 33 as well as all the plates 34 excepting the one that serves as the bottom plate of the column, may be replaced by ledges 29. The extensions 25, 28, (and as many more under them as an increase in the number of matrix font groups may necessitate) must extend for the full width of the series of group separating rails and of the entrance mouths 13 to 20 to provide surfaces connecting the respective series of rails with the respective group of entrance mouths.

The sides of the matrices which contact with the rails 4 are hereafter referred to as the operative sides to distinguish them from the top sides which are not affected by, nor concern, the invention.

A modification of the invention consists in dispensing with the separation of the different groups. According to it, all the matrices have flat operative sides, there is no port 27 or support 28 because no second group of magazines is required.

It is to be noted that in the constructional form illustrated, the paths of the matrices from the magazine entrance 23 to the delivery mouth of the magazines inclusive is an inclined one, so that the power that moves the matrices along their paths is gravity modified by friction between the operative faces of the matrices and the surfaces over which they move, so far exactly as in the commercial machine above mentioned.

Apart from their coöperation with the grooved matrices for the purpose of separating them from the flat matrices, the rails 4 are only matrix supports intermediate of the magazine entrance and the magazines. And the ledges 29 on the sides of the magazine entrance mouths 13 to 20 are also only matrix supports. As such, the said supports may be dispensed with, the magazines 5 to 12 being located with their grooves 31 and ledges 29 close up to the front edges of the extensions 25, 28.

A matrix escapement lever 36—Fig. 5ª—has the usual two pawls 37 adapted to co-operate with the two lugs 22 on the respective side edge of a matrix by being wholly within the respective matrix channel and pivoted upon the respective side wall 30. The front ends of the levers of each column of matrix channels, are connected to a link 39 working in the well known way in a plane at right angles to the slope of the magazines and through the latter, each link being normally depressed by a spring 40 to lock the respective matrices back and having its bottom end operatively connected to the top end of the usual escapement rod 41 that connects the said column of levers 36 with the keyboard 42 in the usual way.

The column of magazines, magazine-group-entrances, extensions, rails and general magazine entrance are all rigidly fast together and to a magazine frame 43 in the usual way.

The multiplicity of magazines makes it necessary that the delivery mouth of only one of the improved magazines should be open at a time. Figs. 5ª, 7, and 7ª show the mouths of magazines 5 to 10 and 12 closed and the mouth of magazine 11 open. The present invention provides improved means for keeping all the delivery mouths closed excepting one, and also improved means for enabling the operator to open and keep open that of the magazine from which he wishes to compose. These means are as follows:—44 is a rock shaft extending along the top of each mouth and turning in suitable bearings, e. g., in the side walls 30 and bearings 45 on a bracket 46 fast to the column of magazines. Each shaft 44 carries one or preferably a series of mouth closers 47. All the mouth closers are in the same plane and are fast to the respective shaft 44. If each shaft has only one mouth closer 47, the latter extends for the full width of the respective delivery mouth; if it has a series as shown in Figs. 7 and 7ª, each mouth closer is only as wide as a matrix channel 31. 48,—Figs. 5 and 7ª—is a rectangular frame fast to the machine frame conveniently near the keyboard 42. 49; 49 are a series of horizontal pull-and-push rods working from front to rear and vice versa in the frame 48. There are as many of these rods 49 as there are shafts 44, each rod 49 being connected to one of the said shafts in such a way that the push in or pull out of the rod 49 will rock the respective shaft 44 accordingly, thereby either opening or closing the delivery mouth controlled by it.

The connection between a rod 49 and its shaft 44 consists of a pair of inclined slots 50 in the raised vertical sides 51 of a slot 52 in a rod 49; a vertical rod 53 having a transverse pin 54 near its bottom end engaged in both slots 50 and its top end pivotally connected to one arm of a bell crank lever 55 fulcrumed at an independent point 56, say on the machine frame; and an inclined rod 57 having its bottom end pivotally connected to the other arm of the lever 55 and its top end passed through a guide 58 on the bracket 46 and finished as a rack 59 which is in constant engagement with the rear side of a pinion 60 fast on the adjacent end of the said rod 44. With a connection exactly as just specified, pulling out a rod 49 opens all the delivery mouth closers 47 controlled by it through the connected shaft 44 and it is preferred that it should be a pull on a rod 49 as distinguished from a push that should do this. But it is absolutely necessary that the opening of the said mouth closers 47 should be accompanied by the closing of all those then open and the leaving of all the others closed. To provide for this an adaptation of a lazy tongs is provided. This adaptation consists of a series of links 61 pivotally connected together, each link by its opposite ends to respectively its two neighbors, and the outer ends of the two outer links pivotally connected to the frame 48 at 62, 63; a roller 64 on each pivot intermediate of the two points 62, 63; a groove 65 in the frame 48 for alternate rollers 64 to roll in; and a plate 66 on each rod 49 for the other rollers 64 to roll over, one roller contacting only with its own plate. The series of plates 66 are alined with each other (or would be) when all the rods 49 are in the pushed in position. The parts enumerated are so correlated that only one pair of links 61 can be spread at a time and that the spread position of this pair compels all the others to be closed. Thus pulling out the rod 49 which controls the delivery mouth of magazine 11, pushes in the rod 49 that was previously out, and leaves all the other rods in the pushed in position.

67 is a handle on the front end of each rod 49 outside the frame 48 and 68 is a stop on each rod to prevent it being pushed in by the operator or pulled out by him through the lazy tongs too far.

69—Figs. 5, 7, and 7ª—is the assembler entrance delivering the matrices on to the usual assembler belt 70. The entrance 69 may be of any suitable type but it must have channels 71 adapted to receive the matrices on the flat and these channels must have matrix turners 72 to turn them into the usual edge-to-the-front position before they are delivered to the belt 70. It is shown as pivoted at 73 for being swung up from before the column of magazines 5 to 12.

Figs. 9 and 9ª, show a combination of the above described column of magazines, matrices, and the necessarily associated parts, with a machine known commercially under the trade mark "Linotype" having a single stationary magazine 74, single distributer 21, single magazine entrance 75, single assembler entrance 76, and magazine frame 77, but omitting, to prevent confusion, the magazine mouth closers shown and described with reference to Figs. 5 and 7. For the purpose of the said combination, the distributer 21 is of the well known construction to serve the magazine or magazines 74, i. e., it has ninety permutations, ninety being the number of characters in a magazine 74. But as the magazines 5 to 12 take their matrices on the flat and must for the sake of convenience be of the same width as a magazine 74, each of them can have say only thirty matrix grooves, a number which is quite sufficient for display work and the like. The matrices of the last mentioned magazines are toothed to drop from each third (to suit the proportion just stated) permutation on the distributer and the magazine entrance 23 is grooved accordingly. The magazine entrance 75 is of the known construction and has the usual rocking motion about a pivot 78 up to and away from the distributer 21.

79 is one of the escapements of the said magazine 74; 80, its escapement rod; and 81, the intermediate lever and push rod. Seeing that all the magazines of the column 5 to 12, must be out of action when a magazine 74 (or one of them) is in action, and vice versa; that there is only a single key board, and, only a single distributer for both column 5 to 12 and magazine or magazines 74; three things are necessary—first, only either of the two magazine entrances 23 or 75 may be in operative relationship with the distributer at a time; second, each key lever of the keyboard must actuate the respective escapement rod 80 through the corresponding one 41; and third, only either set of escapement rods, 41 or 80, may be in operative connection with its respective set of escapement levers 36 or 79, at the same time. Thus if a magazine 74 is to be used, the magazine entrance 75 must be in operative relationship with the distributer 21; the set of escapement rods 80 must be connected with the set 41 so as to be actuated by them respectively, rod by rod; and the set 41 must be out of operative connection with its escapement levers 37. It is preferred that the means for supplying the three necessities above stated should be under the control of a single device, e. g., a hand lever pivoted on the key board 42. But each means may be under a separate controlling device.

82 is the hand lever just mentioned.

The means for actuating the two magazine entrances consist of the following parts. 83 is the fulcrum of the lever 82, and 84 a rearwardly extending arm operatively fast to the lever 82. 85 is a link connecting the arm 84 to an arm extending rearward from the magazine entrance 75. 87 is an arm fast on the end of the said entrance and 88 is a link from it to the entrance 23. The latter instead of being fast to the column of magazines 5 to 12 or to the matrix supports leading thereto, is for the purpose of this part of the invention telescopically connected therewith in order that it may slide rearward into operative relationship with the distributor and frontward out of such relationship. This sliding is between the magazine frame 43 and a roller 89 carried by an independent stationary bracket 90. The fulcrum 83 may be and preferably is a rod extending to the opposite side of the column of magazines where there is a second set of parts 84 to 90.

The means by which each key lever of the key board 42 actuates the respective escapement rod 80 are as follows:—Each rod 80 stands immediately behind the respective rod 41 and is connected with it by a bell crank lever 91 fulcrumed at 92 in a suitably supported and stationary casing or support 93. The front end of a lever 91 rests upon a shoulder 94 conveniently produced by a notch 95 in the rear edge of a rod 41, while the rear end of the same lever is bent to the front and is in engagement with the said rod 80. The ends of a lever 91 are preferably bent as shown to facilitate their engagement with a shoulder 94 and a rod 80.

The means by which only either set of escapement rods 41 or 80 may be in operative connection with its respective set of escapement levers 36 or 79 at the same time, consists of an upstanding arm 96 operatively fast to the hand lever 82, a link 97 from it to one arm of a bell crank lever 98 fulcrumed on the keyboard 42 and a link 99 from the other arm to a bar 100 fast to the set of levers 91 behind their fulcrum 92 and a link 101 extending upward from the lever 82, having a cam surface 102 on its rear edge and the like on its front edge but opposed to each other and both engaging in a loop 103 fast on the rear end of a bar 104 having fast on its front end a loop 105 embracing the top ends of the set of rods 41. Provided that the functions of the three means just described are reserved, their respective details may be varied to any extent.

106 is a magazine mouth closer for a magazine 74 worked from the link 101 through an arm 107. The position chosen for illustration is that proper for composition from and distribution into the magazine 74. The three means and the magazine mouth closer 106 were moved thereinto by pushing down the lever 82. Pulling it up puts them into position proper for composition from and distribution into the column of magazines, by (a) making the link 85 pull the magazine entrance 75 out of and the magazine entrance 23 into operative relationship with the distributer 21, (b) making the link 97 pull the front ends of the levers 91 clear of the highest position of the shoulders 94 and the link 101 push the set of rods 41 into contact with their respective links 39. The same motion of the link 101 closes the mouth closer 106.

The respective positions of the column of magazines 5 to 12 and the installation of stationary magazines 74 together with the coöperating escapements, escapement rods and entrances, may be reversed.

Fig. 10 shows means by which the column of magazines 5 to 12 can be rocked up out of composing and distributing position, away from a magazine or magazines 74, far enough to allow of a "quick change" of the latter or of any of them being effected. These means consist in the said column being separate from the adjacent matrix supports 13 to 20 leading up to its entrance mouths; in each link 57 having a joint 108 in it; in the said column being pivoted on a suitable extension 109 of the main frame of the machine; and in the said joints 108 and pivot having a common axis. 110 is a suitable extension of the column to receive the pivot; 111, a hand lever for rocking the column up and down; and 112, a stop on the column positioned to engage a detent 113 on the extension 109 when the column has been rocked up.

I claim:—

1. The combination of a magazine having a series of channels, and a column of matrices stored end to end in each channel, the matrices in the adjacent columns being arranged edge to edge, for the purpose described.

2. In a typographical machine comprising matrices of different forms, the combination of a plurality of magazines, a channel or conductor along which the matrices travel, and a series of fixed ledges or switches extending to the respective magazines and with one or another of which the matrices will engage according to their form, for the purpose described.

3. In a typographical distributing machine, the combination of a plurality of magazines; a plurality of different matrix fonts distinguished from each other by magazine selecting lugs arranged at different levels setwise of the matrices according to font; and supports located at corresponding levels in the paths of the matrices to their magazines and on which the said selecting lugs can respectively engage.

4. In a typographical distributing machine, the combination of a plurality of magazines; a plurality of different matrix fonts distinguished from each other by magazine selecting lugs arranged at different levels setwise of the matrices according to font; supports located at corresponding levels in the paths of the matrices to their magazines and on which the said selecting lugs can respectively engage; and supports located in the magazines at corresponding levels to receive the matrices distributed to them respectively.

5. In a typographical distributing machine, the combination of a plurality of magazines; a plurality of matrix fonts divided into two groups by the operative sides of one group being flat and those of the other grooved, the fonts of each group distinguished from each other by magazine selecting lugs arranged at different levels according to font; rails along which all the matrices slide and which the grooved matrices straddle, thereby separating the grooved fonts from the flat ones; supports located at levels corresponding with the lug levels and respectively in the paths of the matrices to their magazines; and a port located between the rails and the said supports.

6. In a typographical distributing machine, the combination of a plurality of magazines, a plurality of matrix fonts divided into groups by the operative sides of one group being flat and those of another grooved, the fonts of one group being distinguished from each other by having magazine selecting lugs arranged in different setwise positions on the matrices according to font, a rail along which all the matrices slide and which the grooved matrices straddle, thereby separating the grooved fonts from the flat ones, and supports or switches onto which the separated matrices are delivered and by which they are carried to one or another of the magazines according to the location of their selecting lugs.

7. In a typographical distributing machine, the combination of a plurality of magazines adapted to carry their matrices on the flat; a plurality of matrix fonts distinguished from each other by magazine selecting lugs at different levels setwise of the matrices according to font; a distributer separating the matrices according to character and dropping each in an edge-on position; a magazine entrance common to all the magazines; means for turning the matrices as they pass through the said entrance, from the edge-on into the on-the-flat position; means intermediate of the said entrance and the entrance mouths of the magazines, for separating the matrices into fonts; and means for delivering the separated matrices into their respective magazines.

8. In a typographical composing and distributing machine, the combination of a plurality of magazines adapted to carry their matrices on the flat; a plurality of matrix fonts distinguished from each other by magazine selecting lugs at different levels setwise of the matrices according to font; a distributer separating the matrices according to character and dropping each in an edge-on position; a magazine entrance common to all the magazines; means for turning the matrices as they pass through the said entrance from the edge-on into the on-the-flat position; means intermediate of the said magazine entrance and the entrance mouths of the magazines for separating the matrices into fonts; and a single assembler entrance divided to receive the matrices issuing from the plurality of magazines and to deliver them at a given point; and means for turning them from the on-the-flat into the edge-on position as they pass through the said assembler entrance.

9. In a typographical distributing machine, the combination of a plurality of magazines each adapted to carry a complete font of matrices; a plurality of different matrix fonts; a single distributer separating the matrices according to character irrespective of the font; a magazine entrance common to the plurality of magazines; and fixed means intermediate of the said entrance and the entrance mouths of the said magazines for separating the matrices into fonts.

10. In a typographical composing and distributing machine, the combination of a plurality of magazines each adapted to carry a complete font of matrices; a plurality of different matrix fonts; a single distributer separating the matrices according to character irrespective of font; a magazine entrance common to the plurality of magazines; fixed means intermediate of the said entrance and the entrance mouths of the said magazines for separating the matrices into fonts; and a single assembler entrance divided to receive the matrices issuing from the said magazines and to deliver them at a given point.

11. In a typographical distributing machine, the combination of a plurality of magazines; a plurality of different matrix fonts distinguished from each other by having magazine selecting lugs at different levels setwise of the matrices; and ledges at different levels corresponding respectively with the levels of the matrix lugs and on which the said lugs can automatically engage according to font.

12. In a typographical distributing machine, the combination of a plurality of magazines; a plurality of matrix fonts distinguished from each other by having magazine selecting lugs at different levels setwise of the matrices; and ledges at different levels in the magazines corresponding respectively with the levels of the matrix lugs and on which these lugs can automatically engage according to font.

13. In a typographical distributing machine, the combination of a plurality of magazines; a plurality of matrix fonts distinguished from each other by having magazine selecting lugs at different levels; a magazine entrance common to all the magazines; magazine entrance mouths intermediate of the said magazine entrance and the plurality of magazines and having ledges at different levels corresponding respectively with the levels of the matrix lugs and on which the latter can automatically engage according to font; and ledges in the magazines registering respectively with the ledges just mentioned.

14. In a typographical distributing machine, the combination of a plurality of magazines; a plurality of matrix fonts distinguished from each other by having magazine selecting lugs at different levels setwise of the matrices; a magazine entrance common to all the magazines; and ledges at different levels in the magazines registering respectively with the levels of the matrix lugs.

15. In a typographical distributing machine, the combination of a plurality of magazines; a plurality of matrix fonts distinguished from each other by having magazine selecting lugs at different levels; a magazine entrance common to all the magazines; magazine entrance mouths having ledges at different levels corresponding respectively with the levels of the matrix lugs and on which the latter can automatically engage according to font; ledges in the magazines registering respectively with the ledges just mentioned; and matrix supports intermediate of the said magazine entrance and magazine entrance mouths.

16. In a typographical distributing machine, the combination of a plurality of magazines; a plurality of different matrix fonts distinguished from each other by having matrix selecting lugs at different levels and divided into groups of fonts by some of the fonts having flat and the others grooved operative sides; rails for separating the grooved matrices from the ungrooved ones; and ledges at different levels corresponding respectively with the levels of the matrix lugs and on which the said lugs can automatically engage according to font.

17. In a typographical distributing machine, the combination of a plurality of magazines; a plurality of matrix fonts distinguished from each other by having matrix selecting lugs at different levels and divided into groups of fonts by some of the fonts having flat and the others grooved operative sides; and ledges at different levels in the magazines corresponding respectively with the levels of the matrix lugs and on which these lugs can automatically engage according to font.

18. In a typographical distributing machine, the combination of a plurality of magazines; a plurality of matrix fonts distinguished from each other by having magazine selecting lugs at different levels and divided into groups of fonts by some of the fonts having flat and the others, grooved operative sides; a magazine entrance common to all the magazines; rails for separating the grooved matrices from the ungrooved ones; magazine entrance mouths intermediate of the said rails and the plurality of magazines and having ledges at different levels corresponding respectively with the levels of the matrix lugs and on which the latter can automatically engage according to font; and ledges in the magazines registering respectively with the ledges just mentioned.

19. In a typographical distributing machine, the combination of a plurality of magazines; a plurality of matrix fonts distinguished from each other by having magazine selecting lugs at different levels and divided into groups of fonts by some of the fonts having flat and the others, grooved operative sides; a magazine entrance common to all the magazines; and ledges in the magazines registering respectively with the levels of the matrix lugs.

20. In a typographical distributing machine, the combination of a plurality of magazines; a plurality of matrix fonts distinguished from each other by having magazine selecting lugs at different levels and divided into groups of fonts by some of the fonts having flat and the others, grooved operative sides; a magazine entrance common to all the magazines; magazine entrance mouths having ledges at different levels corresponding respectively with the levels of the matrix lugs and on which the latter can automatically engage according to font; ledges in the magazines registering respectively with the ledges just mentioned; and separating rails intermediate of the magazine entrance and the ledges of the entrance mouths of the magazines.

21. In a typographical machine, the combination of a plurality of magazines, movable flaps to cover the delivery mouths of the magazines, actuating devices connected to the several flaps to effect both their opening and closing, and means whereby the opening movement of one of said actuating devices effects positively the closing movement of another of said devices.

22. In a typographical machine, the combination of a plurality of magazines, movable flaps to cover the delivery mouths of the magazines, actuating devices connected to the several flaps to effect both their opening and closing, and direct connections between the several actuating devices whereby the opening movement of one effects positively the closing movement of another.

23. In a typographical machine, the combination of a plurality of magazines, movable members to confine the matrices within the magazines, a series of independently operable actuating devices connected to the several matrix confining devices for moving them both to active and inactive position, and means whereby the movement of one of said members to inactive position positively effects the movement of another to inactive position.

24. In a typographical machine, the combination of a plurality of magazines, a corresponding plurality of shiftable devices to select one or another of the magazines, and means whereby the actuation of one of the selecting devices restores a previously actuated one to its normal or original position, the said means acting also to prevent the actuation of more than one of the selecting devices at a time.

25. In a typographical composing and distributing machine, the combination of two independent magazine installations each with its own matrix escapements; a single distributer and a single keyboard common to both installations and a magazine entrance for each; a set of escapement rods for each installation connecting its matrix escapements to the said keyboard; means by which only either of the two magazine entrances can be in operative relationship with the said distributer at the same time; means by which each key lever on the key board must actuate the respective escapement rod to one of the installations through the respective escapement rod to the other of them; means by which only either set of escapement rods can be in operative connection with its respective matrix escapements at the same time; and a device for actuating each of the said means.

26. In a typographical composing and distributing machine, the combination of two independent magazine installations each with its own matrix escapements; a single distributer and a single key board common to both installations and a magazine entrance for each; a set of escapement rods for each installation connecting its matrix escapements to the said key board; means by which only either of the two magazine entrances can be in operative relationship with the said distributer at the same time; means by which each key lever on the key board must actuate the respective escapement rod to one of the installations through the respective escapement rod to the other of them; means by which only either set of escapement rods can be in operative connection with its respective matrix escapements at the same time; and a device common to all the three said means for actuating them in unison.

27. In a typographical composing machine, the combination of a single key board; two independent magazine installations each having its own matrix escapements and escapement rods operatively connecting them respectively with the key board; a set of levers in constant engagement with one set of escapement rods and capable of being in engagement with the other set at the same time; and manually operated means for engaging them with the said other set and at the same time disconnecting the latter from its matrix escapements and alternatively for disengaging them from the other set and at the same time connecting the latter with its matrix escapements.

28. In a typographical composing machine, the combination of two independent installations of magazines, the one consisting of a magazine resting directly on the machine frame and being capable of being "quick changed" with reference thereto, the other consisting of a column of superposed magazines having mouth closers controlling the respective delivery mouths and normally resting upon the one installation just mentioned; means located near the key board of the machine for actuating the said closers; connecting rods from the said means to the mouth closers; a pivotal connection between the main frame of the machine and the bottom front edge of the column about which it can be rocked to the front off the said other installation to allow of a "quick change" in the latter; and a pivot in each of the said connecting rods axially alined with the pivot of the column.

29. Distributing mechanism comprising in combination means for distributing the matrices according to character regardless of font, means for dividing the matrices so distributed into groups, one at least containing a plurality of fonts, and further means for separating the matrices in the respective groups according to individual font.

30. Distributing mechanism comprising, in combination, means for distributing the matrices according to character regardless of font, means for dividing the matrices so distributed into groups, each comprising a plurality of fonts, and further means for separating the matrices in the respective groups according to individual font.

31. In a typographical machine, the combination of a plurality of fonts of type or matrices adapted to travel endwise through the machine and formed with projecting ears which are located in different setwise positions on the matrices of the respective fonts, and means to coöperate with the matrices during their endwise travel and deliver them at one point or another according to the location of their projecting ears.

32. In a typographical machine, the combination of a plurality of fonts of type or matrices, those of one font being formed in their side faces with longitudinal grooves and those of another font being without such grooves, and means to coöperate with the matrices and deliver them at one point or another according to form.

33. A magazine comprising two parallel side plates and a series of intermediate partition plates, the said partition plates being formed in their opposing faces with grooves wherein the ears of the matrices engage, and the said grooves lying in the same plane so that the matrices in adjacent columns will be arranged edge to edge, for the purpose described.

34. In a typographical machine, the combination of a magazine formed with a series of channels wherein the type or matrices are arranged end to end in a flatwise position, a distributer, and means for giving the matrices a quarter turn in their passage from the distributer to the magazine.

35. In a typographical machine, the combination of a magazine formed with a series of channels wherein the type or matrices are arranged end to end in a flatwise position, and assembling devices to receive the type or matrices from the magazine and constructed to give them a quarter turn in their passage therethrough.

36. In a typographical machine, the combination of two series of escapements, two series of actuating devices therefor, and means for moving one series of actuating devices into operative relation to the corresponding series of escapements, and simultaneously moving the other series of actuating devices out of operative relation to its corresponding series of escapements.

37. In a typographical machine, the combination of two fixed series of escapements, two distinct series of actuating devices therefor, one operated by the other, and means for moving one of said series of actuating devices out of operative relation to its corresponding series of escapements at will.

38. In a typographical machine, the combination of two magazines each provided with a series of escapements, two series of actuating devices for the escapements, two magazine entrances, one for each of the magazines, and means for bringing one or another of the magazine entrances into operative relation to its corresponding magazine and simultaneously connecting the escapements of said magazine with their corresponding actuating devices.

39. In a typographical machine, the combination of a plurality of magazines to contain the type or matrices, and a series of shiftable devices for selecting one or another of the magazines, the said devices being interconnected in such manner that the shifting of one will directly and positively return another to its normal position.

40. In a typographical machine comprising matrices formed with projecting ears located in different setwise positions on the respective matrices, the combination of a conductor along which the matrices travel endwise, and means to coöperate with the matrices in their endwise travel and deliver them at one point or another according to their form.

41. In a typographical machine comprising matrices formed with projecting ears located in different setwise positions on the respective matrices, the combination of a conductor along which the matrices travel endwise, and a series of ledges or switches to coöperate with the matrices in their endwise travel and deliver them at one point or another according to their form.

42. In a typographical machine, the combination of matrices each formed with projecting ears, a conductor along which they travel endwise, and a series of superposed ledges or switches located in the path of travel of the matrices, the said matrices having their projecting ears located in different setwise positions so as to engage one or another of the switches according to their form.

43. In a typographical machine comprising matrices, some formed with a longitudinal groove in their side faces and others having their side faces plain or flat, the combination of a conductor along which the matrices travel, and means to coöperate with the matrices during their travel and deliver them at one point or another according to form.

44. In a typographical machine comprising matrices, some formed with a longitudinal groove in their side faces and others having their side faces plain or flat, the combination of a conductor along which the matrices travel, and a rail or switch located in the path of travel of the matrices and adapted to be straddled by the grooved ones while the others will be engaged thereby and deflected from their path of travel; whereby the matrices are delivered at different points according to their form.

45. In a typographical machine, the combination of a conductor along which the matrices travel, a series of fixed ledges or switches to receive the matrices and deliver them at different points, and a further rail or switch located in advance of said series and adapted to control the passage of the matrices thereto.

46. In a typographical machine comprising matrices, the combination of a conductor along which they travel, a series of fixed ledges or switches to receive the matrices and deliver them at different points, and a rail or switch located in advance of said series, some of the matrices being formed with grooves to clear the rail, and others being without such grooves so as to be delivered thereby, to the series of switches and formed with projecting ears located in different setwise positions thereon so as to engage one or another of the switches according to their form.

47. In a typographical machine comprising matrices formed with projecting ears located in different setwise positions thereon, the combination of a conductor along which they travel, two series of fixed ledges or switches to receive the matrices and deliver them at different points according to the location of their projecting ears, and a rail or switch located in advance of the two series, some of the matrices being formed with grooves to clear the rail so as to pass onto one of the series of fixed ledges, and others being without such grooves so as to be deflected by the rail onto the other series of fixed ledges.

In witness whereof I have hereunto set my hand in the presence of two witnesses.

WILLIAM EBENEZER ELLIOTT.

Witnesses:
 WILLIAM BURNS,
 HERBERT WILLIAMS.